(12) United States Patent
Lee et al.

(10) Patent No.: US 7,550,036 B2
(45) Date of Patent: Jun. 23, 2009

(54) GAS CONCENTRATOR

(75) Inventors: Junbae Lee, Seoul (KR); Seong-Moon Cho, Anyang-si (KR); Don-Hee Lee, Anyang-si (KR)

(73) Assignees: Sunbio2 Co. Ltd., Anyang-Si (KR); LG Electronics Inc., Seoul (KR)

( * ) Notice: Subject to any disclaimer, the term of this patent is extended or adjusted under 35 U.S.C. 154(b) by 592 days.

(21) Appl. No.: 10/522,547

(22) PCT Filed: Jun. 8, 2004

(86) PCT No.: PCT/KR2004/001367

§ 371 (c)(1),
(2), (4) Date: Jan. 17, 2006

(87) PCT Pub. No.: WO2005/014145

PCT Pub. Date: Feb. 17, 2005

(65) Prior Publication Data

US 2006/0144240 A1    Jul. 6, 2006

(30) Foreign Application Priority Data

| Aug. 12, 2003 | (KR) | .................. 20-2003-0025957 U |
| Sep. 5, 2003 | (KR) | .................. 20-2003-0028577 U |
| Sep. 9, 2003 | (KR) | .................. 20-2003-0028982 U |
| Sep. 16, 2003 | (KR) | ...................... 10-2003-0063901 |

(51) Int. Cl.
*B01D 53/02* (2006.01)
(52) U.S. Cl. .............................. 96/130; 96/133; 96/135
(58) Field of Classification Search .................. 96/121, 96/130, 133, 135; 55/309, 311; 95/96, 148
See application file for complete search history.

(56) References Cited

U.S. PATENT DOCUMENTS 4,222,750 A * 9/1980 Gauthier et al. ............... 95/102
5,679,134 A   10/1997 Brugerolle et al.

FOREIGN PATENT DOCUMENTS

EP    1027914 A2    8/2000

(Continued)

*Primary Examiner*—Robert A Hopkins
(74) *Attorney, Agent, or Firm*—Birch, Stewart, Kolasch & Birch, LLP

(57) ABSTRACT

The present invention relates to a gas concentrator, which produces concentrated gas by applying a pressure difference to adsorbent having selective adsorption property to specific gas from mixed gas and by separating the specific gas. According to the present invention, there is provided the gas concentrator, comprising a filter for filtering out impurities from the mixed gas; a plurality of adsorption beds containing the adsorbent for separating the specific gas from the mixed gas supplied via the filter and including a backflow prevention means formed on channels through which the separated gas is discharged therefrom; a small pipe for interconnecting the channels at production stages of the adsorption beds with each other to perform processes of cleaning and applying vacuum pressure to the adsorption beds; a vacuum pumping means which is connected to a channel for supplying the mixed gas to the adsorption beds and generates the pressure difference caused from a difference between the a vacuum pressure and a pressure of the mixed gas; a valve means comprising a channel base of a single body formed with channels respectively connected to the adsorption beds, the channel for supplying the mixed gas, and the vacuum pumping means, and solenoid drivers mounted in the channel base for switching the channels formed in the channel base in order to alternately apply the vacuum pressure and the pressure of the mixed gas to the adsorption beds; and a gas supplying means for controllably supplying the mixed gas supplied from the filter to the gas separated and produced from the adsorption beds and then supplying a target space with the gas of which flow rate and concentration is controlled.

7 Claims, 5 Drawing Sheets

FOREIGN PATENT DOCUMENTS

| | | |
|---|---|---|
| EP | 1027915 A2 | 8/2000 |
| JP | 5-031318 A | 2/1993 |
| JP | 8-281043 A | 10/1996 |

* cited by examiner

GAS CONCENTRATOR

TECHNICAL FIELD

The present invention relates to a gas concentrator for separating specific gas by applying a pressure difference to adsorbent out of apparatuses for separating specific gas from mixed gas, more particularly, to a gas concentrator in which respective valve means connected to two adsorption beds for containing adsorbent are integrated and simultaneously additional backflow prevention means for protecting the adsorbent are provided, and which is simplified into a simple configuration by engaging the valve means to the adsorption beds in a cap attaching manner.

BACKGROUND ART

In general, methods for producing enriched gas by separating specific gas from mixed gas are commercially and mainly divided into a method using a gas separation membrane and a pressure swing adsorption (PSA) method using a pressure difference applied to adsorbent such as zeolite molecular sieve (ZMS) or carbon molecular sieve (CMS). The PSA method is a process for producing enriched gas by applying the pressure difference to the adsorbent having a selective adsorption property to specific gas. The PSA method is subdivided into a general PSA method operating under atmospheric pressure or higher, a vacuum swing adsorption (VSA) method subjected to a vacuum pressure process, and a vacuum pressure swing adsorption (VPSA) method, a combination thereof, according to an operational pressure due to the pressure difference. All the above methods are called the PSA method.

The PSA method which has been developed since 1950s is often employed to commercially produce oxygen, nitrogen, hydrogen, and the like, and is applied to an oxygen water purifier or air cleaner lately in addition to air dry and thus also applied to an oxygen concentrator in the form of small sized electric home appliances. In the case that high concentrated oxygen, nitrogen, or the like is industrially produced, adsorption beds containing the adsorbent are mostly set up in the form of a tower and operate in connection with a plurality of valves.

However, when a small oxygen concentrator is applied to medical treatment or electric home appliances, the dimensions and economical efficiency thereof should be generally considered. Therefore, the oxygen concentrator should be designed to have simple adsorption beds and valves and to be effectively combined with the other parts, contrary to an industrial concentrator. Accordingly, efforts have been made to continue simplifying the adsorption beds and peripheral devices used in the vacuum swing adsorption method at the maximum by using a minimum number of the valves and devices. In the general PSA method operating under atmospheric pressure or higher, devices for sequentially applying the pressure to the respective beds have been configured by providing a plurality of the adsorption beds and a rotary valve as a valve. Although such a method has advantages in that deviation in the concentration and flow rate is small and relatively stable production is possible, there is a limitation to minimization of the rotary valve itself as mechanism comprising a motor and a rotary plate on which channels are formed. In addition, there is a limitation to economical efficiency. Furthermore, even in the case that solenoid valves are employed in the respective adsorption beds, since the solenoid valve is generally for a high pressure of one (1) atmosphere or higher, there are disadvantages in that the higher degree of process and the precision configuration, which lead to expensive costs, are required and operational control is complicated.

FIG. 1 is a schematic view of a gas concentrator having two adsorption beds 1 and 1' for a conventional PSA process, which is generally well known. Here, an operational process of the gas concentrator is determined according to combination of pumping means. That is, according to a vacuum pumping means 4 or a gas compressing means 8 which applies a pressure to gas, the processes will be compared. If the gas compressing means 8 is solely used, since the adsorption process by the adsorbent is determined by the pressure of the gas compressing means 8 and a pressure for a desorption process generally becomes atmospheric pressure, the general PSA process is achieved.

In addition, if the vacuum pumping means 4 and the gas compressing means 8 are simultaneously used, since the desorption pressure becomes a vacuum pressure caused from the vacuum pumping means 4, the VPSA process, which operates between the vacuum pressure and a pressure by the gas compressing means 8, is achieved. If a gas supplying means 7 which is a kind of the vacuum pumping means is combined with the vacuum pumping means 4 without using the gas compressing means 8, since the adsorbent in the adsorption beds 1 and 1' is not subjected to a compression force, the VSA process, which operates under atmospheric pressure or lower, is achieved.

Further, if all of the gas compressing means 8, the vacuum pumping means 4, and the gas supplying means 7 are used, although the VPSA process is achieved, such a case is hardly used due to the complicated configuration and economical problems.

Furthermore, since the minimization by developing a variety of processes is applied to the adsorption beds 1 and 1' and a valve means 2 used in the V(P)SA process which operates under a vacuum pressure contrary to the PSA method which operates under atmospheric pressure or higher as described above, the design of the adsorption beds 1 and 1' and the valve means 2 suitable to the VSA process is required.

That is, as shown in FIG. 1, a plurality (two or more) of the adsorption beds 1 and 1' containing the adsorbent may be used. In addition, the valve means 2 for switching channels directly connected to the adsorption beds 1 and 1' functions to exchange the vacuum pressure applied by the vacuum pumping means 4 and the pressure of mixed gas flowing in through the filter 3 or the pressure of the gas compressing means 8, which are applied to the adsorption beds 1 and 1', with each other.

In general, if the two adsorption beds 1 and 1' are used, the respective adsorption beds 1 and 1' are provided with separate solenoid valves (not shown) which are controlled. If the number of the adsorption beds 1 and 1' is large, a rotary valve (not shown) in which the channels are formed on a rotary plate driven by means of a motor to supply mixed gas to the respective adsorption beds 1 and 1' may be used.

As shown in FIG. 1, if the VSA process, in which the two adsorption beds 1 and 1', the vacuum pumping means 4, and the gas supplying means 7 are used, is employed, since there is no compression force applied to the valve means 2, a pilot type solenoid valve that is generally used cannot be used, but only a direct acting type solenoid valve that is driven by a direct electric force may be used.

In addition, if a single 4-way solenoid valve is used, due to its configuration, it is impossible to control the respective adsorption beds. It may be only configured such that if the adsorption bed 1 is opened, the other adsorption bed 1' should be closed. Therefore, a flexible process cannot be realized. In addition, since the outside should communicate with one of the adsorption beds, there is a problem of the protection of the adsorbent if additional sealing devices are not used.

Therefore, generally independent 3-way solenoid valves may be used. In such a case, the connection along with the adsorption beds 1 and 1' is complicated and the connection between the valves of the valve means 2 is required. Accordingly, there are problems of increase in dimensions, complicatedness of assembly, and disadvantage in economical efficiency.

Furthermore, a gas separating method which is commercially used has advantages and disadvantages. In the method using the gas separation membrane, although an apparatus therefor is simple, there are disadvantages related to the environment temperature, moisture discharge, or the like. In the method using the adsorbent, although there is no problem of the moisture discharge, an apparatus therefor is complicated, and it is need to pay particular attention to usual safekeeping of the adsorbent since the adsorbent is susceptible of impurities and particularly moisture.

Therefore, in the case that the adsorbent is used, the disadvantage should be compensated for by simplifying the apparatus therefor at the maximum and the apparatus should be configured so as to be less influenced by the moisture. Although it is required to filter only up to dust by performing a preprocess well in the case that the gas separation membrane is used, adsorption of fine impurities and moisture gradually increases in the case that the adsorbent is used since the adsorbent should be recycled and then used during the process. In this respect, the V(P)SA process in which a recycling process is performed by a vacuum pressure may be advantageous as compared with the general PSA process, in point of a process.

However, if the adsorption beds are not completely isolated from the outside even in the case that the V(P)SA process is used, moisture among the air can be absorbed when the operation is stopped. In order to prevent that, moisture absorbent or the like may be used. However, since it is not a method for essentially solving the problem, additional devices for completely isolating the adsorption beds 1 and 1' from the external air are needed. A practical PSA article has a disadvantage in that all of the adsorption beds 1 and 1' cannot be sealed if there is no additional valve in the case that a single valve is used in order to reduce cost.

Although a plurality of general valves may be used in order to seal the adsorption beds from the external air, since such a valve means has the problems of expensive cost, complicatedness in control, and increased dimensions, a simpler apparatus has been required.

DISCLOSURE

Technical Problem

The present invention is conceived to solve the aforementioned problems in the prior art. An object of the present invention is to provide a gas concentrator which increases productivity through a simplified assembly of a valve means and adsorption beds by simplifying the valve means used in a VSA process and simply combining and integrating the valve means with adsorption beds, makes it possible to embody simplification for assembling a small sized gas concentrator through modularization of devices for the VSA process, and simultaneously, secures the reliability of the devices and the increase in economical efficiency caused from realization of low cost and minimization of the devices by completely isolating and protecting adsorbent, which is in safekeeping after using the apparatus, from the air.

Technical Solution

According to an aspect of the present invention for achieving the objects, there is provided a gas concentrator, which produces concentrated gas by applying a pressure difference to adsorbent having selective adsorption property to specific gas from mixed gas and by separating the specific gas. The gas concentrator comprises a filter for filtering out impurities from the mixed gas; a plurality of adsorption beds containing the adsorbent for separating the specific gas from the mixed gas supplied via the filter and including a backflow prevention means formed on channels through which the separated gas is discharged therefrom; a small pipe for interconnecting the channels at production stages of the adsorption beds with each other to perform processes of cleaning and applying vacuum pressure to the adsorption beds; a vacuum pumping means which is connected to a channel for supplying the mixed gas to the adsorption beds and generates the pressure difference caused from a difference between the a vacuum pressure and a pressure of the mixed gas; a valve means comprising a channel base of a single body formed with channels respectively connected to the adsorption beds, the channel for supplying the mixed gas, and the vacuum pumping means, and solenoid drivers mounted in the channel base for switching the channels formed in the channel base in order to alternately apply the vacuum pressure and the pressure of the mixed gas to the adsorption beds; and a gas supplying means for controllably supplying the mixed gas supplied from the filter to the gas separated and produced from the adsorption beds and then supplying a target space with the gas of which flow rate and concentration is controlled.

In addition, according to the present invention, the channel base, which is formed in the single body formed with the channels, may be formed with mounting portions for mounting the solenoid drivers, bed connecting portions to be connected to the adsorption beds, and a channel connecting portion to be connected to the channel for supplying the mixed gas. Thus, the channel base may be inserted into and engaged with the adsorption beds by a cap attaching manner.

Further, according to the present invention, the solenoid driver may comprise a frame for supporting the whole of the driver; a coil housed in the frame for providing a motive force by a current supplied; a plunger for opening and closing the channel through its reciprocation by the motive force of the coil; a guide pipe for guiding the plunger; and a pumping means connecting portion extended on the guide pipe.

Furthermore, according to the present invention, the backflow prevention means formed on the respective channels for discharging the gas separated from the adsorption beds may be selected out of a check valve or small flow rate reduction pipe with flow resistance. Each of the check valves which is selected may comprise an outer guide formed on the channel; a check plunger which is inserted in the outer guide and a body of which is formed with the channel; a sealing damper attached to the check plunger so as to be in close contact with an inlet of the outer guide of a portion where the gas flows in; and a supporting spring positioned at an outlet of the outer guide of a portion where the gas is discharged to support the check plunger.

Still furthermore, according to the present invention, a sealing means for preventing backflow of the discharged gas separated and discharged from the adsorption beds and simultaneously blocking off external air may be installed on a suction or discharge channel of the vacuum pumping means.

Still furthermore, according to the present invention, the gas supplying means may supply the target space with the gas of which the flow rate and concentration is controlled by using flow rate control means. One of the flow rate control means is installed on the channel for controlling flow rate of the gas discharged through the adsorption beds. The other one of the flow rate control means is installed on a channel for supplying the mixed gas which has not passed through the adsorption beds.

Advantageous Effects

As described above, in an apparatus operating under a vacuum pressure according to a VSA process, the present invention effectively can increase economical and mechanical efficiency and be applied to small sized electric home appliances due to its reduced dimensions by simplifying and minimizing connecting portions of valve devices according to the present invention for switching channels and adsorption beds containing adsorbent therein.

In addition, the present invention increases hardness of the apparatus since valve drivers and adsorption bed containers are engaged to a single structure, reduces its dimensions by integrating the adsorption beds and valves, and has an economical effect due to reduction of manufacturing cost by modularizing the devices which need connection of only a pumping means and other control means.

The present invention also has advantages in that it is possible to safekeep the adsorbent in the adsorption beds for a long time since the adsorbent is completely sealed even while the gas concentrator is not used.

BEST MODE

Hereinafter, the present invention will be described in detail with reference to the accompanying drawings.

Figure 3:
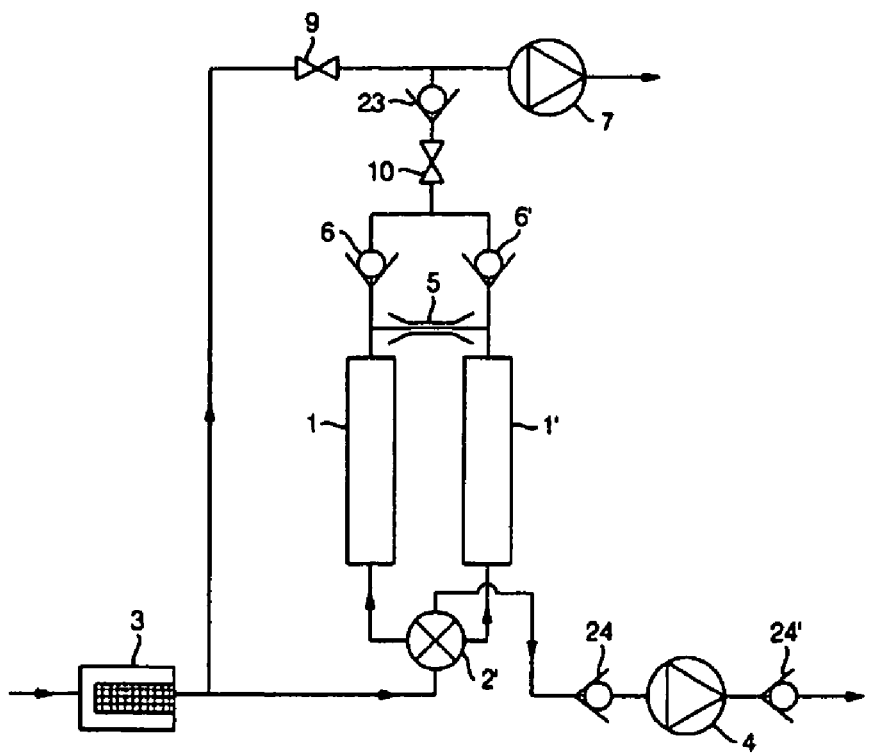
FIG. 3 is a schematic view showing a first embodiment of a gas concentrator for the VSA process according to the present invention.
Figure 4:
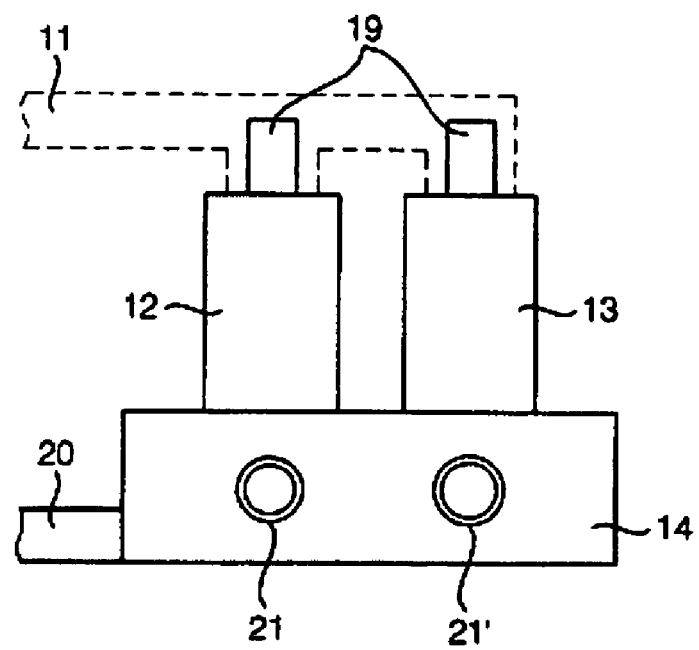
FIG. 4 is a front view showing a valve means applied to the gas concentrator for the VSA process according to the present invention.
Figure 5:
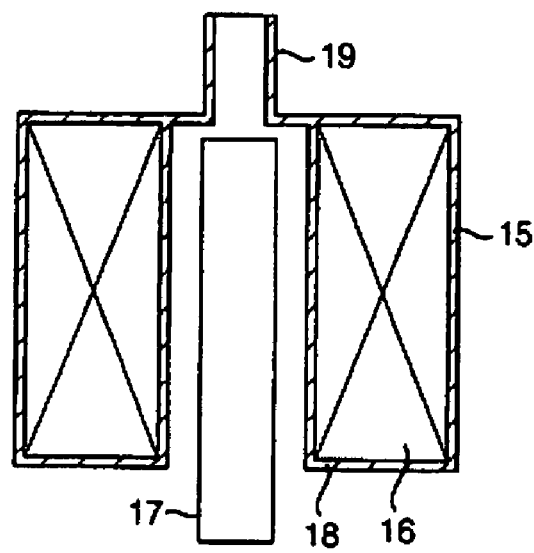
FIG. 5 is a front sectional view showing a solenoid driver applied to the gas concentrator for the VSA process according to the present invention.
Figure 6:
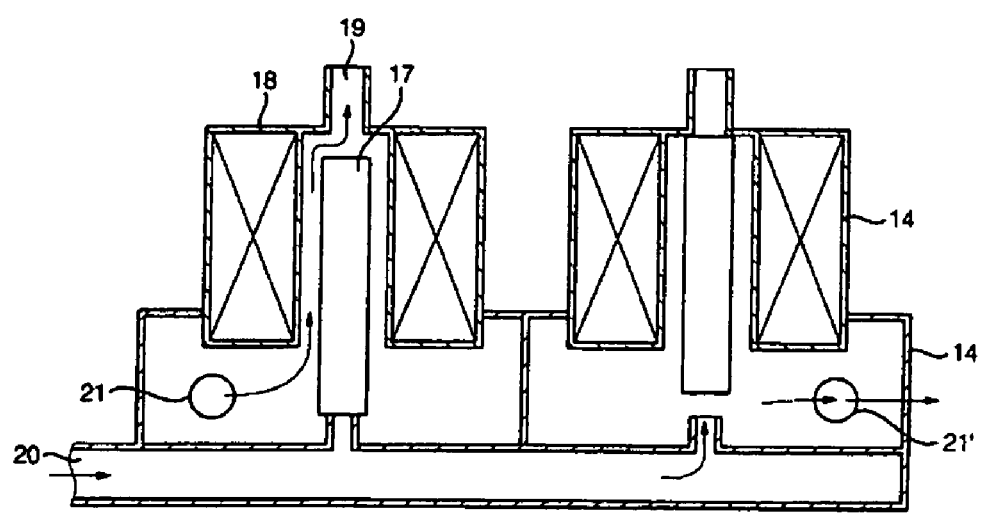
FIG. 6 is a front sectional view showing the valve means applied to the gas concentrator for the VSA process according to the present invention.
Figure 7:
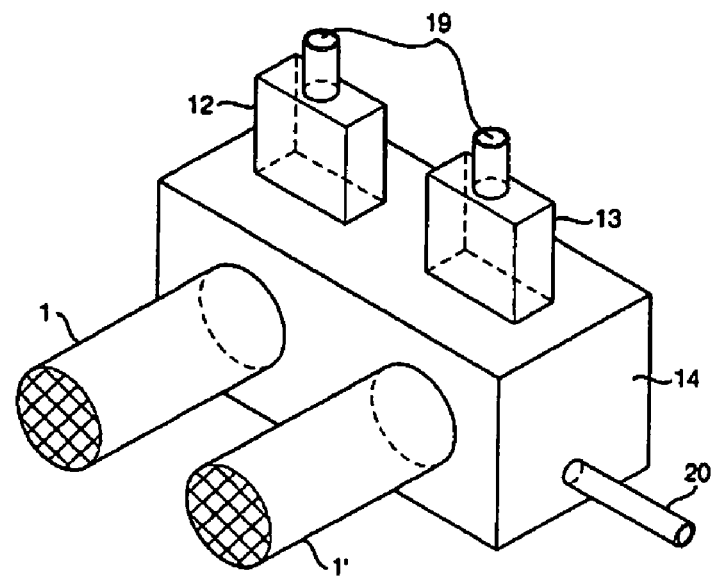
FIG. 7 is a perspective view showing the valve means applied to the gas concentrator for the VSA process according to the present invention with adsorption beds being engaged to the valve means.

FIG. 3 is a schematic view showing a first embodiment of a gas concentrator for a VSA process according to the present invention; FIG. 4 is a front view showing a valve means applied to the gas concentrator for the VSA process according to the present invention; FIG. 5 is a front sectional view showing a solenoid driver applied to the gas concentrator for the VSA process according to the present invention; FIG. 6 is a front sectional view showing the valve means applied to the gas concentrator for the VSA process according to the present invention; and FIG. 7 is a perspective view showing the valve means applied to the gas concentrator for the VSA process according to the present invention with adsorption beds being engaged to the valve means.

The present invention is applied to the concrete embodiment as shown in the above respective figures. The present invention is not limited to the concrete embodiment, but various modifications thereto can be made within the scope without departing from the technical spirit of the present invention.

Upon review of the fundamental operation of the gas concentrator of the present invention shown in FIG. 3, first, a vacuum pumping means 4 forms a vacuum pressure in an adsorption bed 1, and mixed gas flows in the adsorption bed 1 via a valve means 2 after passing through a filter 3 by a pressure difference between a pressure of the mixed gas and the vacuum pressure.

The adsorbent in the adsorption bed 1 adsorbs gas of specific component, and then, gas of the other components which are less or not adsorbed is sucked via a check valve 6 and a flow rate control means 10 by a gas supplying means 7 and sprayed to a target space. In general, while the adsorption bed 1 is in a producing stage, the other adsorption bed 1' is subjected to a recycling process. In such a recycling process, a part of produced gas moves to the adsorption bed 1' through a bed connecting small pipe 5, so that the processes of cleaning the beds and applying vacuum pressure are performed. The bed connecting small pipe 5 is employed as an equilibrium valve in the industrial filed, or configured to form a channel for simply connecting between the adsorption beds 1 and 1'.

The flow rate control means 9 and 10 determine the flow rate and concentration of the supplied gas. The mixed gas passing through the filter 3 may be properly mixed with produced gas passing through the flow rate control means 9 according to need as in an oxygen concentrator applied to a device such as an air cleaner. While a multi-bed system with three or more adsorption beds 1 and 1' is used in the industrial filed, a system with two adsorption beds is mainly used for small sized applications.

In addition, a pair of the check valves 6 and 6' provided on gas discharge channels of the adsorption beds 1 and 1' function to desorb the interiors of the adsorption beds 1 and 1' by the vacuum pumping means 4. The check valves as many as the number of the adsorption beds 1 and 1' are used as devices for preventing a backflow from the gas supplying means 7 when the vacuum pressure is formed.

As shown in FIG. 4, a valve means 2', which makes it simple to assemble the adsorption beds 1 and 1' and makes it possible to realize the simplification in assembly of the small sized gas concentrator through modularization of the devices for the VSA process, is applied to the gas concentrator of the present invention operating as above.

The valve means 2' comprises a channel base 14 of a single body formed with connecting portions 21 and 21' for the adsorption beds 1 and 1' and a filter connecting portion 20 which is a mixed gas supply channel, and a pair of solenoid drivers 12 and 13, which are mounted in the channel base 14, for switching channels formed in the channel base 14 in order to alternately apply the vacuum pressure and the pressure of the mixed gas to the adsorption beds 1 and 1'.

The solenoid drivers 12 and 13 used in the present invention, which are often used in machinery operating under the vacuum pressure, comprise a direct acting type that is driven by only an electric force. As shown in FIG. 5, each of the solenoid drivers 12 and 13, which is the same as a general solenoid, comprises a frame 15 for supporting the whole of the driver, a coil 16 for providing a motive force as a current flows, a plunger 17 having opening and closing function through its reciprocation, and a guide pipe 18 for guiding the plunger 17. A spring not shown applies a force to the plunger 17 in normal state so that the valve means 2' is maintained in an opened or closed state.

In addition, pump connecting portions 19 formed on the solenoid drivers 12 and 13 are connected to each other by means of a channel connecting portion 11 shown in FIG. 4 which is connected to the vacuum pumping means 4 of the gas concentrator of the present invention. The filter connecting portion 20 of the channel base 14 is connected to the filter 3 for filtering and supplying the mixed gas. The bed connecting portions 21 and 21' are connected to one ends of the adsorption beds 1 and 1', respectively.

Then, the adsorption beds 1 and 1' connected to the bed connecting portions 21 and 21' selectively accommodate the vacuum pressure caused from the vacuum pumping means 4 and the pressure of the mixed gas applied to the filter connecting portion 20 by means of the opening and closing function of the plunger 17 shown in FIG. 5.

The plunger 17 performs the opening and closing function by the coil 16 which provides the motive force when the current flows as described above. As shown in FIG. 6, while the plunger 17 on the left side of the figure comes down and thus connects the bed connecting portion 21 and the channel connecting portion 11 to each other, the plunger 17' on the right side comes up and thus connects the bed connecting portion 21' and the filter connecting portion 20 to each other.

The valve means 2' configured in a single body as described above may be engaged with the adsorption beds 1 and 1' through the bed connecting portions 21 and 21'. However, in order to simplify the configuration, it is preferred that the valve means 2' be formed integrally along with components of the adsorption beds 1 and 1' and assembled by directly inserting the solenoid drivers 12 and 13 therein.

That is, the adsorption beds 1 and 1' of the present invention, each of which generally comprises a cylindrical container, are configured such that the interiors thereof are filled with the adsorbent and both external sides thereof are closed by a cap forming the connecting portions. Thus, the channel base 14, which is formed with mounting portions for mounting the solenoid drivers 12 and 13 and the filter connecting portion 20 which is the mixed gas supply channel, may be integrated in the form of the adsorption bed cap that connects both the sides thereof.

That is, as shown in FIG. 7, since the bed connecting portions 21 and 21' are extended so as to be inserted into the adsorption beds 1 and 1', the adsorption beds 1 and 1' are engaged with the channel base 14 of the valve means 2' by a cap attaching manner. Further, since the channel base 14 is formed with the mounting portions on which the solenoid drivers 12 and 13 can be mounted, the channel base 14 is directly mounted with the solenoid drivers 12 and 13. In addition, since the filter connecting portion 20 for supplying the mixed gas is also formed on a side of the channel base 14 for the cap attaching manner, the channel base 14 is directly connected to the filter 3.

In FIG. 6 showing the operational relationship of the valve means 2' of the present invention, rubber seals used at contact portions which open and close the channels and the spring are omitted. The solenoid valves operating under the vacuum pressure contrary to ones operating under a high pressure can be manufactured with low cost since the opened and closed portions may be sufficiently formed of rubber and thus a precision processing is not needed. Therefore, the assembly and economical efficiency is more improved as compared with the case that the multi-bed system and rotary valves are used.

In addition, it is apparent to those skilled in the art that as the method for mounting the solenoid drivers 12 and 13 of the present invention to the mounting portions of the channel base 14, in addition to the present embodiment, it is possible to engage the solenoid drivers 12 and 13 to a variety of portions of the channel base 14 in a variety of directions. Furthermore, although the two pump connecting portions 19 are used in the embodiment, the pump connecting portions 19 may be united by using a hose or a separate injection molded article such as the channel connecting portion 11.

Figure 1:
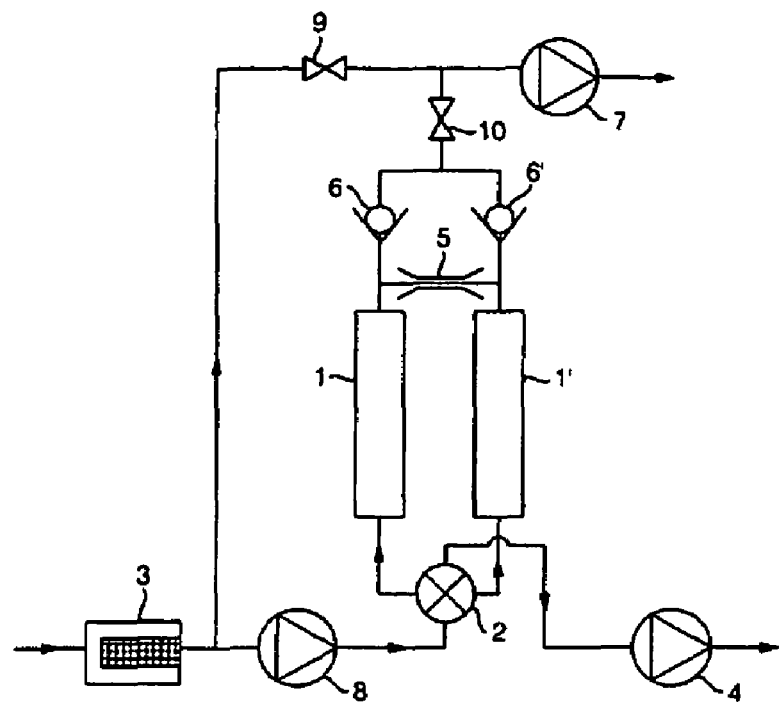
FIG. 1 is a schematic view of a gas concentrator for a PSA process according to a prior art.

In the meantime, while the gas concentrator according to the present invention does not operate and is in standby status, the adsorbent in the adsorption beds 1 and 1' should be completely isolated from the external air in order to prevent the performance from deteriorating. However, in the prior art shown in FIGS. 1 and 2, the adsorbent communicates with the outside via the check valves 6 and 6' and the gas supplying means 7, with a suction filter side via the valve means 2, or with the outside through the vacuum pumping means 4 via the valve means 2.

The producing stage side of the adsorption beds 1 and 1' is isolated from the outside in the case that the check valves 6 and 6' of a complete sealing type are used, and is isolated from the outside by the gas supplying means 7 in a case where the check valves 6 and 6' made of general rubber membrane with a leak are used. In general, a vacuum pump or a blower is used as the gas supplying means 7, wherein a simple check valve is provided therein.

However, since the adsorbent in the adsorption beds 1 and 1' may be influenced in the case that the simple check valve is also not the complete sealing type, an additional complete sealing type check valve should be used.

Further, the single 4-way valve or two of the 3-way valves are used as the valve means 2 in the case of the conventional gas concentrator. While the adsorption beds 1 and 1' are connected to the filter 3 and the vacuum pumping means 4 in the case of the 4-way valve, respectively, the adsorption beds 1 and 1' are selectively connected to the filter 3 and the vacuum pumping means 4 in the case of the 3-way valves.

Therefore, when the filter 3 for filtering and supplying the mixed gas and the adsorption beds 1 and 1' are connected and communicate with each other, moisture absorbent or the like should be included in the filter 3 in order to protect the adsorbent in the adsorption beds 1 and 1'. However, the moisture absorbent has a limitation to its function. In addition, although the vacuum pumping means 4 also has a sealing effect since a check valve is provided therein as in the gas supplying means 7, an alternative method should be demanded if the leak occurs since the degree of the sealing effect differs according to the article.

Figure 8:
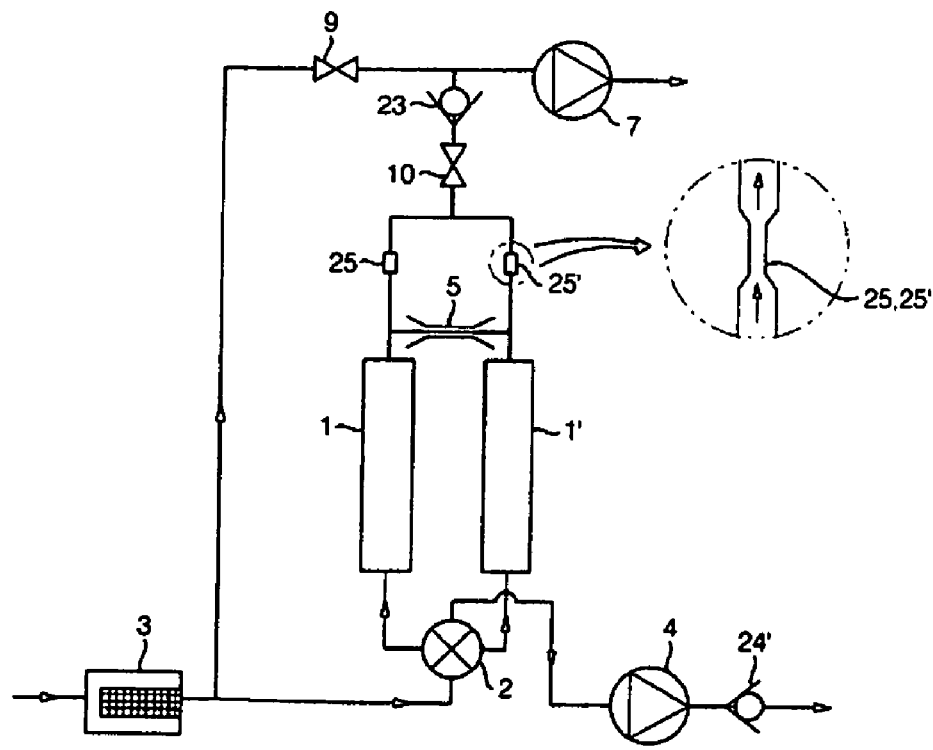
FIG. 8 is a schematic view showing a second embodiment of the gas concentrator for the VSA process according to the present invention.

FIG. 8 is a schematic view showing a second embodiment of the gas concentrator for the VSA process according to the present invention.

The gas concentrator according to the present invention is provided with sealing means 23, 24, and 24' as shown in FIGS. 3 and 8. Even though general solenoid valves may be used as the sealing means 23, 24, and 24', simple and inexpensive check valves are preferred. That is, the sealing means may be employed under the assumption that the leak occurs in all of the check valves 6 and 6' on the channels, to which gas is discharged from the adsorption beds 1 and 1', and the check valve in the vacuum pumping means 4. In such a case, if the check valves 6 and 6' have no problems in sealing or the check valve in the vacuum pumping means 4 operates normally in accordance with the present apparatus, the respective sealing means may be selectively removed.

That is, in the embodiment of the present invention, the filter 3 for filtering and supplying the mixed gas is isolated by the valve means 2'. In general, the check valves 6 and 6' may be sealably configured when the apparatus is configured. However, in the case of the vacuum pumping means 4, since the device is configured according to pump property, which may cause the leak to occur, the sealing means 24 and 24' may be installed on suction and discharge channels of the vacuum pumping means 4, and the sealing means 23 may also be installed on a discharge channel of the gas discharged from the adsorption beds 1 and 1' to the flow rate control means 10 via the check valves 6 and 6'.

The operation of the sealing means 23, 24, and 24' will be described as follows. First, one of the sealing means 24 and 24' of the vacuum pumping means 6 and 6' is selectively used. In the first embodiment of FIG. 3, while the adsorption bed 1 is in the producing stage, if the operation of the other adsorption bed 1' is stopped during the recycling stage which is subjected to the vacuum pressure, the operation of the gas supplying means 7 and the vacuum pumping means 4 is stopped. At this time, the adsorption beds 1 and 1' become in a pressure equilibrium state through the bed connecting small pipe 5 in a moment, and then, reach the state that the interiors thereof are subjected to the vacuum pressure.

Here, the respective sealing means 23, 24, and 24' operate under the state that the pressures of the adsorption beds 1 and 1' are maintained under the vacuum pressure, which functions to isolate the adsorption beds 1 and 1' from the external air. When a general solenoid valve is used, the isolation should be performed the moment the operation is stopped. In such a case, since it is disadvantageous in an economical cost, it is preferred to use a general check valve which operates under a very small pressure as in the embodiment of the present invention. That is, the check valve as the sealing means 24 should be designed so that the check valve causes friction to be minimized when the vacuum pumping means 4 forms the vacuum pressure in the adsorption beds 1 and 1' during the operation of the apparatus and may be smoothly closed by the vacuum pressure applied to the adsorption beds 1 and 1' after the operation is stopped. In a case where the loss of vacuum pressure is produced due to the sealing means 24, the sealing means 24' can be further installed close to a discharge end to overcome the loss of vacuum pressure. The reason is because the loss of vacuum pressure greatly influences the gas concentrator of the present invention. Accordingly, it is preferable to install the sealing means at the discharge end whish is relatively less influenced by the pressure loss.

In addition, it is also preferred that the sealing means 23 installed on the line where the gas is discharged from the adsorption beds 1 and 1' comprise a check valve, for example, including a thin rubber membrane and a spring, which is smoothly closed by the vacuum pressure applied to the adsorption beds 1 and 1' in the state that the operation is stopped, and causes the friction to be minimized in order not to impose a burden on the gas supplying means 7 while producing the gas.

Therefore, if the operation of the gas concentrator is stopped, since the sealing means 23, 24, and 24' automatically operate and are sealed by the vacuum pressure remaining in the adsorption beds 1 and 1', the adsorption beds 1 and 1' are isolated from the external air, and thus, deterioration of the adsorbent does not occur. In addition, during the operation, the vacuum pumping means 4 and the gas supplying means 7 operate almost without problems in their performance.

Even in the case that the general 4-way valve is applied as the valve means 2' of the gas concentrator of the present invention, if the adsorption beds 1 and 1' selectively communicate with the filter 3, an additional sealing means should be used at a side of the filter 3 for the isolation. In such a case, since another cost is added, the above valve type is not preferred.

In the meantime, in the case that the sealing means 23 is used, since the check valves 6 and 6' hardly perform the sealing function, it is preferred that the check valves 6 and 6' be replaced with small pipes 25 and 25'. FIG. 8 to which the above descriptions are referred shows the embodiment of such a case in which the check valves 6 and 6' shown in the first embodiment of FIG. 3 are replaced with the small pipes 25 and 25' having certain flow resistance. In such a case, the vacuum pressure in the adsorption beds 1 and 1' is determined as maximum one by flow resistance of the small pipes 25 and 25', and the bed connecting small pipe 5 used for applying the vacuum pressure to and cleaning the adsorption beds 1 and 1' may be omitted due to the installation of the small pipes 25 and 25' with which the check valves 6 and 6' are replaced.

Figure 9:
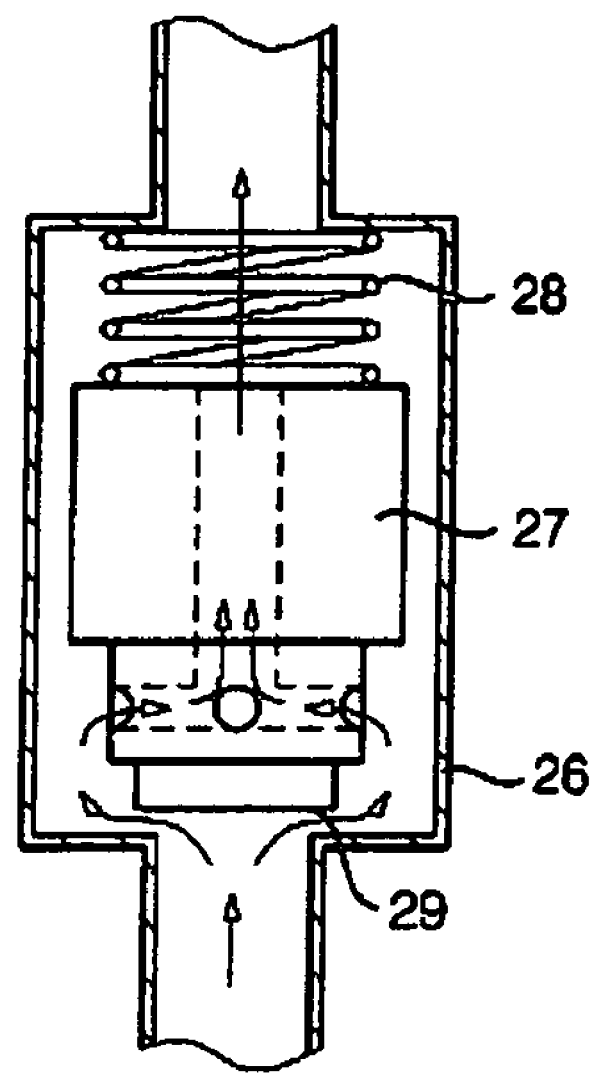
FIG. 9 is a front sectional view showing a check valve applied to the gas concentrator for the VSA process according to the present invention.

FIG. 9 shows an embodiment of a check valve in which it is possible to obtain complete seal by the check valves 6 and 6' of the present invention without separately using the sealing means 23. The check valve differs from a conventional check valve in that a sealing damper 29 is positioned at an end portion of a check plunger 27, which moves within an outer guide 26 of the check valve, and in that sealing is effected by a force of a spring 28 in normal state.

In addition, the gas the stream of which is indicated by arrows in the figure flows into the check plunger 27 through a hole formed in the check plunger 27 and flows out via the spring. Such a configuration of the check valve improves reliability for sealing and durability of the check valve which should continue to reciprocate.

As described above, since the present invention makes it possible to form a adsorption bed module modularized by combining the valve means 2', the adsorption beds 1 and 1', the bed connecting small pipe 5, the check valves 6 and 6', and the control means 9 and 10, in the practical manufacture, it is possible to form the simplified and economical apparatus which operates directly by connecting the gas supplying means 7, the vacuum pumping means 4, and the filter 3.

Figure 2:
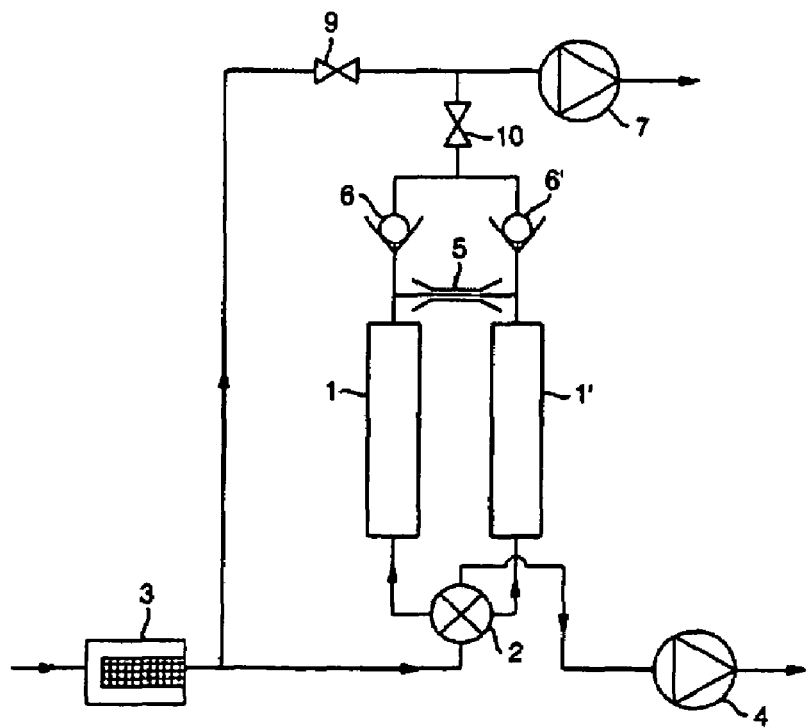
FIG. 2 is a schematic view of a gas concentrator for a VSA process according to a prior art.

In the meantime, FIG. 2 schematically shows the gas concentrator for the VSA process of Korean Utility Model Application No. 2003-25957, which has been previously filed by the present applicant. Referring to FIG. 2, such a gas concentrator can compete with a relatively simple apparatus using a gas separation membrane thanks to the modularization of the adsorption beds 1 and 1' through a simple channel design and the combination of the valve means 2 and the adsorption beds 1 and 1'. Upon review of the relative comparison with the apparatus using the gas separation membrane, there is a difference in that the valve means 2 that must be necessarily connected to the adsorption beds 1 and 1', the bed connecting small pipe 5 that connects both the adsorption beds 1 and 1', and the check valves 6 and 6' as other valve means correspond to one of the gas separation membrane. Thus, the use of the valve means 2 configured simply at the maximum, the use of the check valves 6 and 6' integrated with the adsorption beds 1 and 1', the configuration of the bed connecting small pipe 5 that may be configured simply with the simple assembly, and the like are important factors for minimizing the system and reducing cost.

In the case that the adsorbent is used as in the gas concentrator of FIG. 2, since the adsorbent should be recycled and then used during the process, essentially, the adsorption of fine impurities and moisture gradually increases, and thus, the moisture in the air may be absorbed when the operation is stopped. In order to prevent that, moisture absorbent or the like may be used. However, since it is not an essential solution thereof, additional devices for completely isolating the adsorption beds 1 and 1' of FIG. 2 from the external air are required.

Therefore, in the present invention, the sealing means 24 and 24' are installed on the suction and discharge channels of the vacuum pumping means 4, and the sealing means 23 is also installed on the discharge channel of the gas discharged from the adsorption beds 1 and 1' to the flow rate control means 10 via the check valves 6 and 6', so that the adsorption of the fine impurities and moisture in the air can be prevented by completely isolating the adsorption beds 1 and 1' from the external air even when the operation is stopped.

The invention claimed is:

1. A gas concentrator, which produces concentrated gas by applying a pressure difference to adsorbent having selective adsorption property to specific gas from mixed gas and by separating the specific gas, comprising:
   a filter for filtering out impurities from the mixed gas;
   a plurality of adsorption beds containing the adsorbent for separating the specific gas from the mixed gas supplied via the filter;
   a backflow prevention means formed on channels through which the separated gas in the adsorption beds is discharged;
   a small-diameter pipe for interconnecting the channels at production ends of the adsorption beds with each other to perform processes of cleaning and applying vacuum pressure to the adsorption beds, the small-diameter pipe having a diameter smaller than a diameter of the channels;
   a vacuum pumping means connected to a channel for supplying the mixed gas to the adsorption beds, the vacuum pumping means generating the pressure difference caused from a difference between the a vacuum pressure and a pressure of the mixed gas;
   a valve means comprising a channel base of a single body formed with channels respectively connected to the adsorption beds, a channel connected to a mixed gas supplying channel, and a channel connected to the vacuum pumping means, and solenoid drivers mounted in the channel base for switching the channels formed in the channel base in order to alternately apply the vacuum pressure and the pressure of the mixed gas to the adsorption beds; and
   a gas supplying means for supplying a target space with the gas which flow rate and concentration are controlled by controllably supplying the mixed gas supplied from the filter to the gas separated and produced in the adsorption beds,
   wherein the channel base of the valve means, which is formed in the single body formed with the channels, is formed with mounting portions for mounting the solenoid drivers, bed connecting portions to be connected to the adsorption beds, and a channel connecting portion to be connected to the mixed gas supplying channel,
   wherein each of the solenoid drivers of the valve means comprises a frame for supporting the whole of the solenoid driver, a coil housed in the frame for providing a motive force by a supplied current, a plunger for opening and closing the channel through its reciprocation by the motive force of the coil, guide pipe for guiding the plunger, and a pumping means connecting portion extended on the guide pipe,
   wherein each of the solenoid drivers is divided from one other by a partition,
   and wherein the bed connecting portions are communicated with the channel connecting portion when the pumping means connecting portion is closed by the plunger of the solenoid drivers, and the bed connecting portions are communicated with the pumping means connecting portion when the pumping means connecting portion is opened by the plunger of the solenoid drivers.

2. The gas concentrator as claimed in claim 1, wherein the backflow prevention means formed on the respective channels for discharging the gas separated in the adsorption beds are check valves on flow rate reduction pipes having diameters smaller than a diameter of the channels so as to increase flow resistance and reduce flow rate.

3. The gas concentrator as claimed in claim 2, wherein each of the check valves comprises an outer guide formed on the channels; a check plunger inserted in the outer guide and provided with a channel in a body of the check plunger; a sealing damper attached to the check plunger so as to be in close contact with an inlet of the outer guide of a portion where the gas flows in; and a supporting spring positioned at an outlet of the outer guide of a portion where the gas is discharged to support the check plunger.

4. The gas concentrator as claimed in claim 1, wherein a sealing means for preventing backflow of the discharged gas separated and discharged from the adsorption beds and simultaneously blocking off external air is installed on the channel.

5. The gas concentrator as claimed in claim 1, wherein a sealing means for blocking off external air is installed on a suction or discharge channel of the vacuum pumping means.

6. The gas concentrator as claimed in claim 4 or 5, wherein the sealing means is a check valve.

7. The gas concentrator as claimed in claim 1, wherein in order to supply the target space with the gas which flow rate and concentration are controlled, the gas supplying means cooperates with a flow rate control means installed on a channel for controlling flow rate of the gas discharged through the adsorption beds and a flow rate control means installed on a channel for supplying the mixed gas which has not passed through the adsorption beds.

* * * * *